May 4, 1926.
C. L. RAYFIELD
1,583,178
GASOLINE GAUGE
Filed Sept. 26, 1921
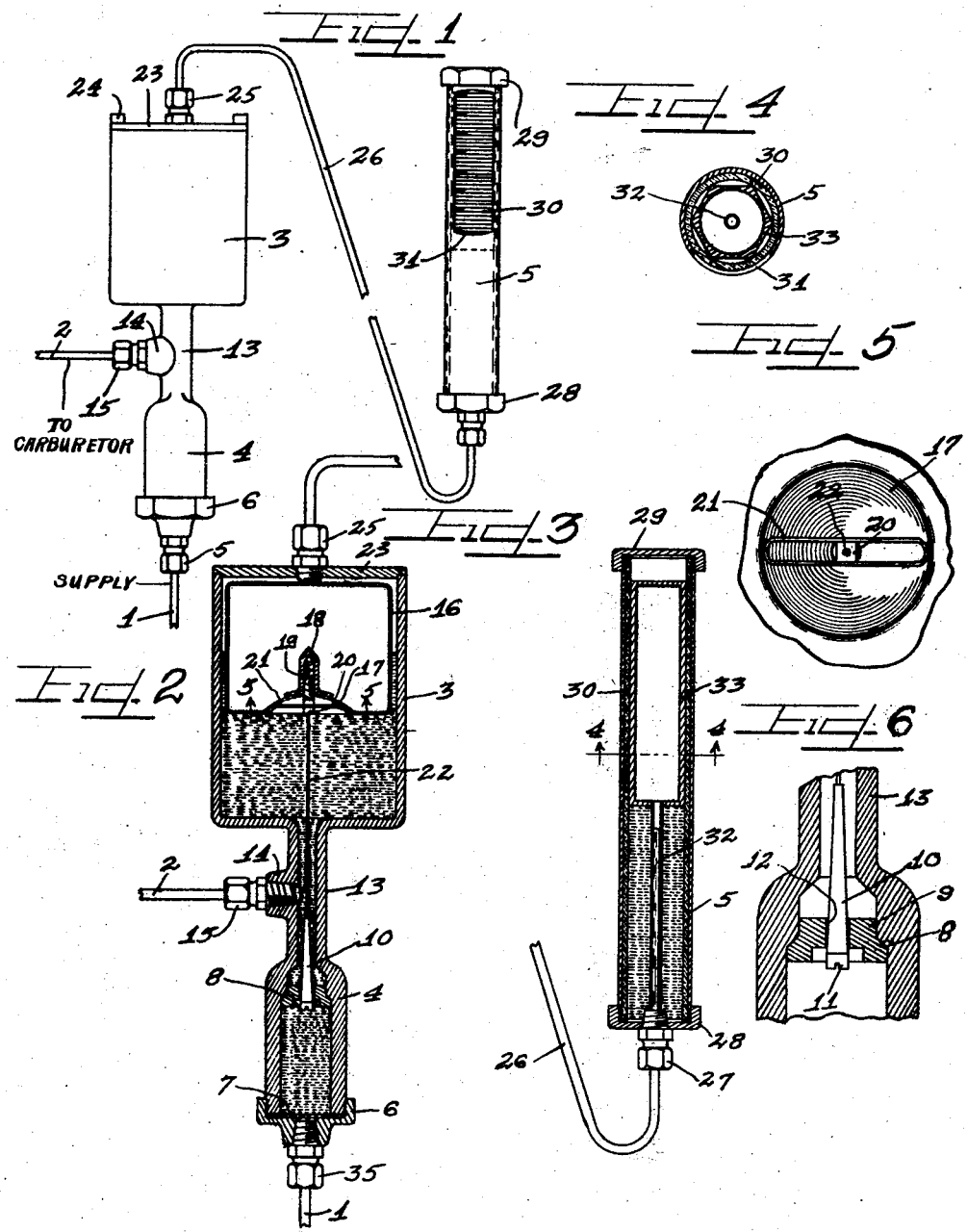

Patented May 4, 1926.　　　　　　　　　　　　　　　　　　　　　　　　1,583,178

UNITED STATES PATENT OFFICE.

CHARLES L. RAYFIELD, OF CHICAGO, ILLINOIS.

GASOLINE GAUGE.

Application filed September 26, 1921. Serial No. 503,367.

*To all whom it may concern:*

Be it known that I, CHARLES L. RAYFIELD, a citizen of the United States, and a resident of the city of Chicago, in the county of Cook and State of Illinois, have invented a new and useful Improvement in a Gasoline Gauge, and I do hereby declare that the following is a full, clear, and exact description of the same, reference being had to the accompanying drawings, and to the numerals of reference marked thereon, which form a part of this specification.

It is an object of this invention to provide a gauge which shall indicate by direct reading the rate of consumption of gasoline.

It is a further object of this invention to accurately position a metering pin in response to the suction developed by the engine and to indicate upon a gauge the position of the same.

It is a further object of this invention to control a metering pin by the position of a float and indicate at a distance the position of the float by means of an air tube.

It is a further object of this invention to provide a gauge in which a hollow body shall be made to move by the removal from, or the introduction of, air into its interior.

It is a further object of the invention to utilize the displacement of a liquid by the movement of such a body to make the level of the liquid indicate the extent of movement.

Other and further important objects of this invention will be apparent from the disclosures in the drawings and in the accompanying specification.

The invention (in a preferred form) is illustrated in the drawings and hereinafter more fully described.

On the drawings:

Figure 1 is a general view of the apparatus.

Figure 2 is a vertical section through the metering pin and float chamber.

Figure 3 is a vertical section through the indicator.

Figure 4 is a section upon the line 4—4 of Figure 3.

Figure 5 is a section upon the line 5—5 of Figure 2.

Figure 6 is an enlarged detailed view of the metering pin shown in Figure 2.

As shown on the drawings:

The apparatus is connected to a pipe 1 which comes from the gasoline supply and delivers through a pipe 2 which goes to the carbureter. The apparatus includes a float chamber 3, a metering pin housing 4 and an indicator casing 5. The pipe 1 is let into the metering pin housing 4 by a connector 35, which screws into the middle of a bottom 6, which screws upon the housing 4. If desired, there may be a screen 7 between the bottom 6 and the housing 4.

The housing 4 is supplied with a shoulder 8 against which is secured the seat 9 for the metering pin 10. The metering pin tapers upward and its lower end is supplied with a slot 11 whereby it may be rotated by a screw driver or similar tool. The tapered portion of the pin passes through a hole 12 in the seat 9 so that when the metering pin is lowered, the size of the opening through which gasoline may pass is increased. When the gasoline has passed the seat 9, it emerges into a pipe 13, connecting the metering pin chamber 4 and the float chamber 3. The pipe 2 leads from the middle of the pipe 13 and is connected thereto by a boss 14 and a fixture or coupling 15.

In the float chamber 3 is a float 16. The under side of this float is provided with a cavity 17, and a cap 18 in the interior of the float fits against the center of the concave part. The interior of this cap is threaded and cooperates with a screw 19. The head 20 of this screw is square, as best shown in Figure 5, and fits between the two sides of a closed loop of spring wire 21, the ends of which are in contact with the sides of the cavity. The screw 19 is connected to the metering pin 10 by a stem 22. The top 23 of the float chamber is held in place by bolts 24 and has in the middle of it a fixture 25 connecting it to a pipe 26.

The pipe 26 leads to a fixture 27 in the bottom of the indicator cylinder 5. This cylinder 5 consists of a tube having at the upper and lower ends screw caps 29 and 28. Inside of this tube 5 is a second tube or lining 30 of glass. The upper part of the tube 5 is cut away on one side as indicated at 31, to expose the glass, and graduations are made upon the exposed part of the glass. The pipe 26 is continued up inside of the tube 5 and glass tube 30, as shown at 32. Slidably connected to this pipe 32 is a piston or float 33. The fit between the pipe 32 and the bottom of the piston 33 is loose enough to permit restricted flow of liquid into the piston, thus serving as a dash pot to prevent fluttering of the piston. The liquid, of course, acts to afford a seal which keeps air or gas from escaping from the piston 33. As shown in Figure 4, the piston 33 is not round and there is space between the sides of it and the sides of the glass tube 30 for liquid to pass.

In the assembly of the device, the metering pin 10 is placed through hole 12 in the seat 9 and the float 16 is screwed onto the upper end of the stem 22. A screw driver held in the slot 11 enables the float to be turned by inserting the fingers through the open top of the float chamber until the float is brought to the correct height. The pressure of the spring wire 21 against the sides of the cavity 17 will prevent any unintentional rotation of the float 16 relative to the metering pin 10 and consequently the adjustment described will be permanent when it is once made.

The bottom 6 and connector 35 are then secured at the lower end of the metering pin housing 4, connecting it to the pipe 1. The boss 14 is connected to the pipe 2 by the coupling 15 and the cover 23, with the pipe 26 connected thereto by the coupling 25, is secured to the top of the float chamber. The other end of the pipe 26 is secured to the pipe 32 through the bottom 28 of the indicator by means of the coupling 27. The top of the indicator tube 29 is removed and sufficient liquid is poured in to bring the piston 33 to such a level that the surface of the liquid stands against the mark zero on the graduations. The cover 29 is then replaced and the device is ready for use. Indicator 5 may be placed at any convenient place in the automobile, if the device is used with an automobile engine, and the metering pin and float chamber may be put in any convenient place between the gasoline supply and the carbureter.

When the engine is started suction is applied to the pipe 2 and causes gasoline to pass from the pipe 1 through the metering pin housing 4, past the needle valve 10, and the needle valve seat formed at the edge of the hole 12, and up the pipe 13 and out the pipe 2. If the flow of gasoline past the metering pin 10 exceeds the demands of the engine, gasoline will flow into the float chamber 3 and cause the float 16 to rise. This will lift the needle 10 closing the metering pin valve. The supply to the engine will thus be checked. When the demand of the engine exceeds the gasoline arriving through the needle valve the engine will draw gasoline from the float chamber, which will cause the float 16 to descend and open the metering pin valve. Consequently the position of the float will correspond exactly to the demands of the engine and the rate of flow of gasoline will be indicated by the position of the float.

When the float descends, air will pass from the pipe 26 into the float chamber 3, and when the float rises, air will be forced from the float chamber into the pipe 26. When air passes from the pipe 26 into the float chamber it will be replaced by air drawn from the interior of the piston 33, with the result that the piston 33 will descend into the liquid and consequently making the level of the liquid stand higher on the graduations of the piston. The thickness of the walls of the piston 33 is so chosen that the weight of the piston is such as to cause it to float partly submerged. In practice it has been found desirable to construct these walls of very thin material. The piston normally stands somewhat higher out of the liquid than its weight alone would determine, because as it descends, it tends to compress the air within it and the increased pressure of air is added to the buoyancy of the water to hold the piston up. Upon descent of the float 16, air passes from piston 33 into pipe 32 and this pressure tends to become less. The piston 33 therefore descends. As it descends, liquid will enter the piston and more of the pipe 32 will be within the interior of the piston. Consequently the volume there available for air is decreased and so the pressure increased. When this increase combined with the increase in buoyant effect of the liquid is sufficient to restore equilibrium the piston ceases to descend.

When air passes from the float chamber into the pipe 26 the reverse action takes place. By making the interior of the piston of suitable cross-section the up and down motion can be made as large as is desired. Consequently, the indicator can be made as sensitive as one wishes. When the piston 33 descends it causes the liquid to ascend because it displaces a greater proportion of liquid. When the piston ascends it causes the liquid to descend for the reverse reason. Hence, the height of the liquid can be made to indicate the degree of demand made by the engine. If desired, however, a pointer or mark may be placed on the piston and the rise and fall thereof directly compared with the graduations on the glass.

The graduations upon the glass 30 may be made directly in gallons per hour, if so desired. It has, however, been noted that the number of miles per gallon obtained from the engine is inversely proportional to the number of gallons per hour used. Consequently, if desired, graduations on the glass 30 may be made to show directly the fuel consumption of the engine in miles per gallon.

I am aware that numerous details of construction may be varied through a wide range without departing from the principles of this invention, and I therefore do not purpose limiting the patent granted otherwise than necessitated by the prior art.

I claim as my invention:

1. A float having a recess in the bottom thereof, a screw threaded cap projecting into the float from said recess, a needle valve, a stem secured thereto, a screw threaded member secured to said stem and threading into said cap and a friction device non-rotatively mounted on said screw threaded member and engaging the walls of said recess.

2. In a liquid supply device, a conduit, a needle valve controlling the flow through said conduit and arranged to lessen said flow upon upward movement of said valve, a float chamber into which the liquid passing said valve can flow, an outlet for the liquid between said needle valve and said float chamber, a float in said float chamber, an adjustable connection between said needle valve and said float, and a pneumatic indicator connected to said float chamber.

3. In a liquid supply device, a conduit, a needle valve controlling the flow through said conduit and arranged to lessen said flow upon upward movement of said valve, a float chamber into which the liquid passing said valve can flow, an outlet for the liquid between said needle valve and said float chamber, a float in said float chamber, an adjustable connection between said needle valve and said float, an indicator actuated by the air moved by said float, said indicator comprising a vertical casing, a liquid partly filling said casing, a vertical tube through the bottom of said casing, a hollow body slidably mounted on said tube whereby the upper end of the tube is within the interior of said body, there being graduations on said casing to co-operate with the upper surface of the liquid, and an air pipe connecting said tube to the float chamber.

In testimony whereof I have hereunto subscribed my name.

CHARLES L. RAYFIELD.